Nov. 27, 1951  A. P. PRATHER ET AL  2,576,415
MOTOR VEHICLE ACTUATED ROAD SPEED CHECKING APPARATUS
Filed Oct. 5, 1950  2 SHEETS—SHEET 1
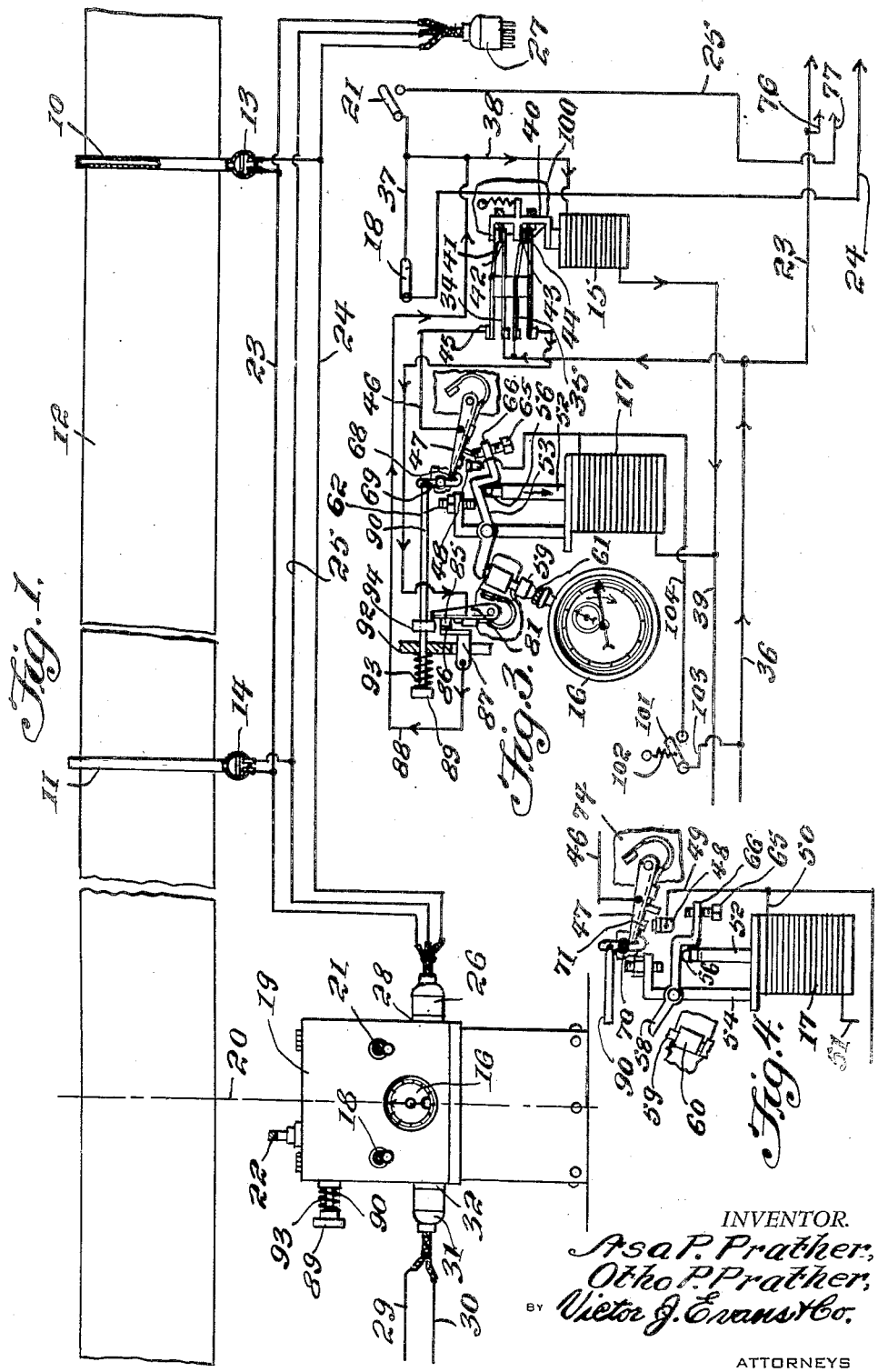
INVENTOR.
Asa P. Prather,
Otho P. Prather,
BY Victor J. Evans & Co.
ATTORNEYS

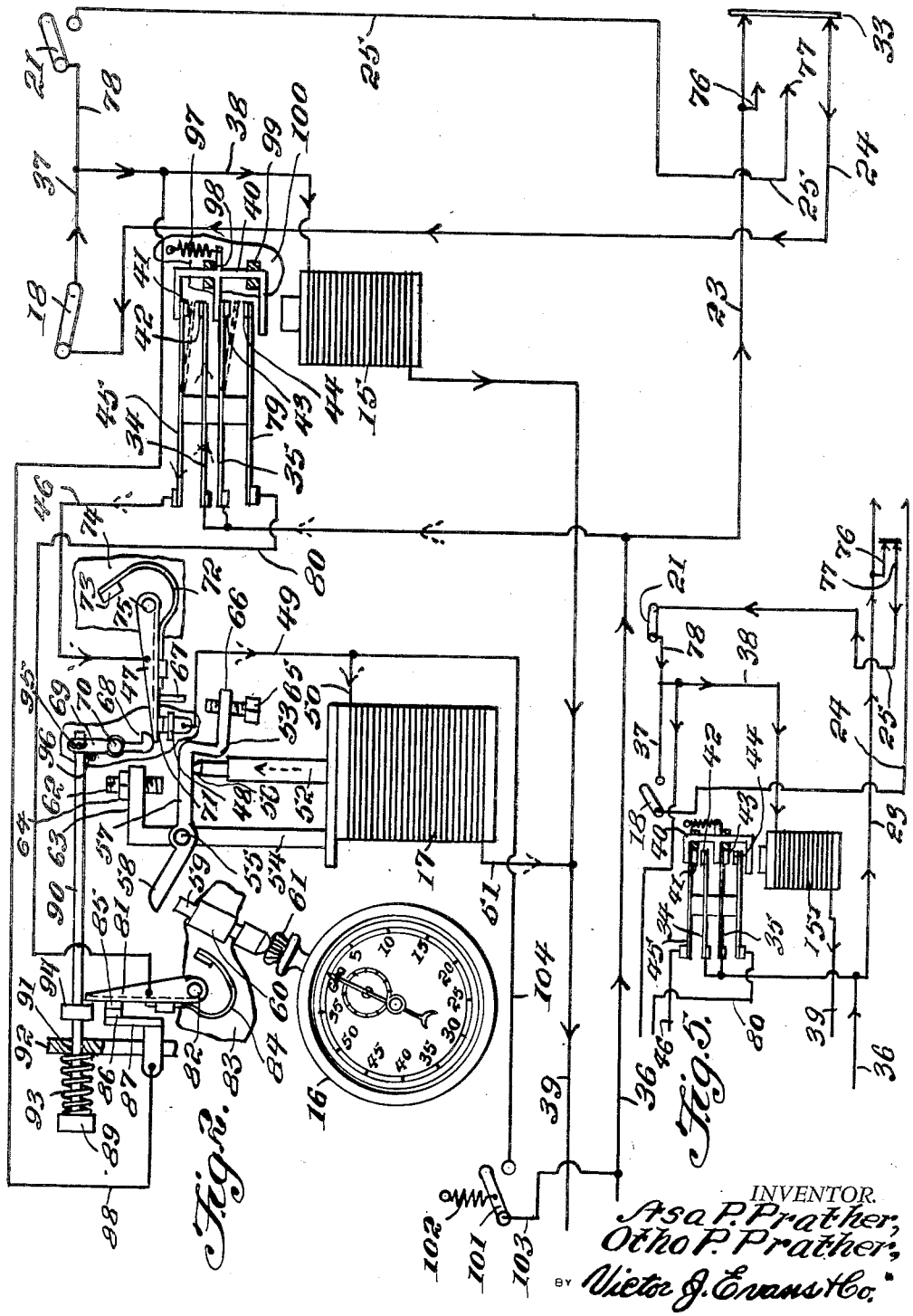

Patented Nov. 27, 1951

2,576,415

UNITED STATES PATENT OFFICE 2,576,415

MOTOR VEHICLE ACTUATED ROAD SPEED
CHECKING APPARATUS

Asa P. Prather and Otho P. Prather,
Georgetown, Ky.

Application October 5, 1950, Serial No. 188,594

4 Claims. (Cl. 161—18)

This invention relates to signal devices used in combination with motor vehicles on highways, and in particular spaced switches actuated by passing vehicles and signal actuating devices whereby the time it takes a vehicle to travel from one switch to another is indicated.

The purpose of this invention is to provide a device for determining the time it takes a vehicle to travel between spaced measured points on a highway, which is manually controlled whereby the parts are operated only by a selected vehicle, and which is portable so that the entire apparatus may be carried to a selected point on a highway and set up in a comparatively few minutes.

Various types of speed traps and speed and other checking devices have been used in combination with motor vehicles on highways and although some of these use spaced indicating devices extended across the highway, it is difficult to trace a selected car, truck or the like as it passes from one device to another and for this reason speed or time indicating devices of this type are not universally used. With this thought in mind this invention contemplates a pair of vehicle actuated devices extended across a highway and connected to signal operating instrumentalities wherein pressure actuated trip devices actuate cut outs as the front wheel of a vehicle pass one of the devices whereby the rear wheels of the vehicle and also wheels of following vehicles may pass freely without actuating the parts, and whereby as the vehicle that has actuated the signal approaches a second device a circuit is closed through a responsive element which, after being actuated by the vehicle, cuts out the parts whereby the device is not responsive to pressure resulting from the passage of the rear wheels or the wheels of following vehicles.

The object of this invention is, therefore, to provide a speed indicating device for determining the speed of a vehicle on a highway in which the device is responsive only to the action of the front wheels of a selected vehicle passing over the device.

Another object of the invention is to provide a speed determining device including a pair of tubes positioned at spaced intervals on a highway and connected to pressure responsive devices positioned in spaced relation to the tubes whereby an officer after checking the speed of a vehicle traveling between the tubes may approach the vehicle as the vehicle passes the point where the officer is stationed.

A further object of the invention is to provide a vehicle checking device that may be placed at spaced points on a highway in which the speed of a vehicle traveling between the points is indicated at a remote point which is spaced from the said former points.

A still further object of the invention is to provide a motor vehicle speed checking device including spaced tubes positioned on a highway and connected to pressure responsive signal elements and a housing in which the said signal elements are positioned, in which the parts are of a comparatively simple and economical construction.

With these and other objects and advantages in view the invention embodies sections of hose extended across a highway and spaced apart a distance previously chosen to conform with a previously calculated time-speed-distance chart. For illustrative purposes, the hoses are placed 366 feet, 9 inches apart. A car traveling at 25 M. P. H. would require 10 seconds to travel the distance between the hoses. The invention also embodies a checking station approximately 300 feet beyond the last hose to be passed over by the car being checked. The checking station contains electrical units and a stop watch and is connected electrically to the highway hoses.

Other features and advantages of the invention will appear from the following description taken in connection with the drawings wherein:

Figure 1 is a diagrammatic view illustrating the relative positions of the pressure tubes and clock and switch housing on a roadway.

Figure 2 is also a diagrammatic view on an enlarged scale illustrating the operating instrumentalities and wiring for the circuit and showing a manually actuated switch in a circuit to one of the pressure tubes in the closed position.

Figure 3 is a similar diagram also showing a switch in the pressure tube circuit closed and illustrating the operation wherein a circuit through the stop watch solenoid is actuating the watch.

Figure 4 is a detail showing the stop watch solenoid with a manually actuated trip holding a switch arm in a circuit to the solenoid in the open position.

Figure 5 is a similar detail illustrating the solenoid of the relay with the double throw switch and showing the manually actuated switch in the circuit of the first or number 1 pressure tube closed.

Referring now to the drawings wherein like reference characters denote corresponding parts the improved motor vehicle actuated speed indicating device of this invention includes pressure tubes 10 and 11 positioned on a highway 12 with pressure actuated switches 13 and 14 positioned to be closed by increased pressure in the tubes 10 and 11, respectively, a relay solenoid 15, a stop watch 16, and a stop watch actuating solenoid 17.

With the parts arranged as disclosed a circuit is normally open and vehicles may pass over the tubes 10 and 11 without operating parts of the circuits, however, as a selected vehicle approaches the tube 10 a switch 18 is closed manually, by an operator at a station in which the instrument 19 may be positioned, which may be located at a point 20, in relation to the tubes 10 and 11 and as the front wheels of the vehicle pass over the pressure tube 10 a circuit is completed to the solenoid 15 which closes a circuit to the solenoid 17 and the solenoid 17 starts the stop watch 16. This circuit is instantly broken so that as the rear wheels of the vehicle pass over the tube 10, or as other vehicles pass over the tube the parts of the circuits do not operate.

As the selected vehicle approaches the second pressure tube 11, the switch 21 is closed manually and as the front wheels pass over the tube 11 the same circuit is completed so that the stop watch is again actuated to stop the watch. By this means the time required for the vehicle to travel from the tube 10 to the tube 11 is indicated on the stop watch.

To reset the mechanism a button 22 on the housing 19 is pressed and a circuit is completed to the solenoid 17 whereby the stop watch is reset to zero.

The signal instigating devices 10 and 11 may be in the form of pneumatic hose, photo-electric cells, commonly referred to as the electric eye, or other signal sending devices. In the design shown it is preferred to use pneumatic hose and the hose is extended across the roadway at the spaced points as illustrated in Figure 1.

The pressure actuated switch 13 of the tube 10 is connected in the circuit by wires 23 and 24 and the switch 14 of the tube 11 is connected in the same circuit by wires 23 and 25, the wire 23 being used in both circuits. These wires extend to plugs 26 and 27 and may be inserted in sockets 28 in the housing 19 and current supply wires 29 and 30 may also be connected to the housing through a plug 31 and a socket 32.

As illustrated in Figure 2 wherein the switch 13 is indicated at the point 33, the wire 23 connects one terminal of the switch to contact arms 34 and 35 of a relay in which the solenoid 15 is positioned and the wire 23 is connected by a wire 36 to a source of electric current. The wire 24 from the opposite terminal of the switch 13 is connected to one terminal of the switch 18, the opposite terminal of the switch 18 being connected by a wire 37 to one side of the solenoid 15 through a wire 38, and from the opposite terminal of the solenoid, the circuit is completed to a source of electric current through a wire 39. By this means, with the switch 18 manually closed and with the switch at the point 33 closed by a vehicle passing over the tube 10 a circuit is completed to the solenoid 15 which draws the armature 40 of the relay downwardly, from the position shown in Figure 2, thereby closing the upper pair of contacts 41 and 42 and also a lower pair of contacts 43 and 44.

The contact 42 is positioned on the upper contact arm 34 and as it is engaged by the contact 41 on the upper arm 45 the circuit is completed through a wire 46 to a lever 47 and from the lever 47 through a contact 48 and the wire 49, to the solenoid 17. The solenoid is connected, at one side, to the wire 49 through a wire 50, and at the other to the source of current supply through a wire 51.

By this means a circuit is completed to the solenoid 17 through the wire 36 and the wire 23 to the contact arm 34 and from the arm 34 through the contacts 41 and 42 and the contact arm 45, through the wire 46, to the lever 47. From the contact 48 the circuit extends to the wire 49 and from the wire 49 through the wire 50 to the solenoid from which it passes through the wire 51 back to the source of current through the wire 39.

As the solenoid 17 is energized the core 52 thereof moves upwardly, and the core actuates a lever 53 pivotally mounted on a bracket 54 by a pin 55 with the end 56 of the core engaging a section 57 of the lever, and with the opposite end 58 of the lever engaging a pin 49 slidably mounted in a bracket 60 and positioned to engage a button 61 of the stop watch 16.

Upward movement of the lever 53 is controlled by a set screw 62 that is threaded in an arm 63 of the bracket 54 and retained in adjusted positions by a lock nut 64.

In this movement a screw 65 threaded in an arm 66 of the lever 53 engages a pin 67 on the under surface of the lever 47 whereby the lever 47 is moved upwardly over a projection 68 on an arm 69 which is pivotally mounted in the housing by a pin 70. As the end of the lever 47 passes over the projection 68 it is retained in the upwardly extended position whereby the contact point 71 on the lower side thereof is separated from the contact 48 and the circuit to the solenoid 17 is broken. The lever 47 is resiliently urged downwardly by a spring 72 on a lug 73 of a bracket 74 on which the lever 47 is pivotally mounted by a pin 75.

By this means a circuit is temporarily completed through the solenoid 17 as the front wheels of a vehicle pass over the tube 10 and as the lever 47 is held upwardly by the projection 68 the circuit is instantly broken to prevent a repeat operation which would stop the stop watch.

This operation starts the stop watch and the watch continues to run until the front wheels of the vehicle pass over the tube 11 and the circuit to the switch 14 of the tube 11 is completed by a switch 21 which is manually closed by an operator in a booth or station at the point 20.

As the selected vehicle, which has been permitted to actuate the circuit as the front wheels thereof travel over the tube 10, approaches the tube 11 the switch 21 is manually closed and a circuit is completed through the wires 23 and 25, the terminals 76 and 77 of which are closed by the switch 14 whereby a circuit is completed from the source of current supply through the wire 36, and the wire 23, to the terminal 76 and from the terminal 77 through the wire 25 to the switch 21. From the opposite terminal of the switch the circuit is completed through a wire 78 and the wire 38 to the solenoid 15, and from the solenoid back to the source of current supply through the wire 39.

The solenoid 15 then repeats the cycle of operations whereby the end 58 of the lever 53 actuates the button 61 of the stop watch to stop the watch.

The device is also provided with a holding circuit whereby a circuit is maintained through the solenoid 15 by the contacts 43 and 44 even though the circuit resulting from the impulse actions of the pressure tubes 10 and 11 is of short duration. The holding circuit is connected to a source of current supply through the wire 36 and the upper part of the wire 23 to the contact 35 through the points 43 and 44 to a contact arm 79 which is connected by a wire 80 to a lever 81, pivotally mounted by a pin 82 on the frame 83 and resiliently held by a spring 84, and from the lever 81 the circuit is carried through contact points 85 and 86, the point 85 being positioned on the lever 81 and the point 86 on a bracket 87. From the bracket 87 the circuit is completed by a wire 88 which extends to the wire 30 and by this wire the circuit is completed to one side of the solenoid 15, the opposite side of which is connected to the other wire 39 which extends to the source of current supply. This holding circuit retains the contacts 41 and 42 closed even though the contacts 71 and 48 are held open.

The holding circuit is broken by a button 89 on a rod 90 which is slidably mounted in an opening 91 in the bracket 92 and resiliently held in the position shown in Figure 2 by a spring 93. The rod 90 is provided with a collar 94 which engages the upper end of the lever 81 and as the button 89 is pressed inwardly the contacts 85 and 86 are separated, thereby temporarily opening the holding circuit.

The inner end of the rod 90 is pivotally connected to the upper end of the arm 69 by a pin 95 and as the arm is actuated by the rod the projection 68 moves away from the end of the lever 47 whereby the lever 47 is released so that contact 71 again engages the contact 48 whereby the circuit to the solenoid 17 is again set whereby the cycle may be repeated as the vehicle passes over the tubes 10 and 11. The arm 69 and the inner end of the rod 90 are retained in position by a pin 96 which extends below the inner end of the rod, as shown in Figure 2.

The holding circuit holds the armature 40 of the solenoid 15 downwardly and as the circuit is broken by the button 89 the spring 97 draws the armature upwardly, thereby opening the contacts 41 and 42, and also the contacts 43 and 44. The armature 40 is slidably mounted in openings in bars 98 and 99, which extend from the wall 100 of the housing.

After the complete cycle of operations it is desired to reset the needle of the stop watch back to zero and for this purpose the button 22 is provided which actuates a switch 101 that is resiliently held in the open position by a spring 102 and, as illustrated in Figure 2 one terminal of the switch is connected by a wire 103 to the source of current supply by the wire 36 and the other terminal of the switch is connected to a wire 104 which is connected to one side of the solenoid 17 through the wire 50, the other side of the solenoid being connected by the wire 51 back to the source of current supply through the wire 39.

This device is disclosed as actuating a stop watch, and it will be understood that the end 58 of the lever 53, may operate indicating or recording means of any other type and particularly such as recording on or actuating a tape, wire, or disc.

It will be understood that although this device is disclosed and described as being used for indicating the speed of a vehicle passing from the tube 10 to the tube 11, it may also be used for various other purposes, such as actuating air operated road switches and signals or it may be used for counting vehicles passing over certain points, and for other purposes.

By this means an officer in a station or booth at the point 20 may readily check the speed of a selected vehicle traveling from the tube 10 to the tube 11 and by the time the vehicle reaches the point 20 the officer may signal the operator of the vehicle, advising him to stop, without the use of sirens and without the necessity of chasing cars at high speeds through traffic.

It will be understood that modifications may be made in the design and arrangement of the parts without departing from the spirit of the invention.

What is claimed is:

1. In a vehicle speed indicator, the combination which comprises pressure tubes positioned at spaced points across a highway, switches positioned to be closed by increase of pressure in the said pressure tubes, a housing, a relay having a plurality of pairs of contact points positioned to be closed by a solenoid therein positioned in the housing, a stop watch in the housing, a lever pivotally mounted in the housing and positioned to actuate starting, stopping and resetting means of the stop watch, a solenoid mounted in the housing and positioned to actuate the said lever for operating the stop watch, circuits connecting the switches actuated by the pressure tubes to the said solenoids, manually actuated switches in the said circuits whereby the circuits to the pressure tubes are set manually as a selected vehicle approaches one of the tubes, means breaking the circuit to the solenoid of the stop watch actuating lever upon completion of the operation thereof, means manually releasing the said circuit breaking means, means manually completing a circuit to the stop watch actuating lever solenoid for resetting the stop watch, a holding circuit for completing a circuit to the solenoid of the relay, and means manually opening the said holding circuit.

2. In a vehicle speed indicator, the combination which comprises pressure tubes positioned at spaced points across a highway, switches positioned to be closed by increase of pressure in the asid pressure tubes, a housing, a relay having a plurality of pairs of contact points positioned to be closed by a solenoid therein positioned in the housing, a stop watch in the housing, a lever pivotally mounted in the housing and positioned to actuate starting, stopping and resetting means of the stop watch, a solenoid mounted in the housing and positioned to actuate the said lever for operating the stop watch, circuits connecting the switches actuated by the pressure tubes to the said solenoids, manually actuated switches in the said circuits whereby the circuits to the pressure tubes are closed manually as a selected vehicle approaches one of the tubes, means breaking the circuit to the solenoid of the stop watch actuating lever upon completion of the operation thereof, means manually releasing the said circuit breaking means, means manually completing a circuit to the stop watch actuating lever solenoid for resetting the stop watch, a holding circuit for completing a circuit to the solenoid of the relay, and means manually opening the said holding circuit and simultaneously releasing the circuit breaking means of the solenoid with the stop watch actuating lever.

3. In a vehicle speed indicator, the combination which comprises pressure tubes positioned at spaced points across a highway, switches positioned to be closed by increase of pressure in the said pressure tubes, a housing, a relay having a plurality of pairs of contact points positioned to be closed by a solenoid therein positioned in the housing, a stop watch in the housing, a lever pivotally mounted in the housing and positioned to actuate starting, stopping and resetting means of the stop watch, a solenoid mounted in the housing and positioned to actuate the said lever for operating the stop watch, circuits connecting the switches actuated by the pressure tubes to the said solenoids, manually actuated switches in the said circuits whereby the circuits to the pressure tubes are closed manually as a selected vehicle approaches one of the tubes, means actuated by the said lever that operates the stop watch for breaking the circuit to the solenoid of the said lever upon completion of the operation thereof, means manually releasing the said circuit breaking means, means manually completing a circuit to the stop watch actuating lever solenoid for resetting the stop watch, a holding circuit for completing a circuit to the solenoid of the relay, and means manually opening the said holding circuit and simultaneously releasing the circuit breaking means of the solenoid with the stop watch actuating lever.

4. A vehicle speed indicator comprising signal means positioned at spaced points on a highway, switches positioned to be closed by said signal means, a housing, a relay in the housing and having contact points positioned to be closed by solenoids therein, an indicating means in the housing, a lever pivotally mounted in the housing and positioned to actuate starting, stopping and resetting means of the indicating means, a solenoid positioned to actuate the said lever, circuits connecting the switches actuated by the said signal means on the highway to the solenoids, manually actuated switches in the said circuits, means breaking the circuit to the solenoid of the indicating means actuating lever upon completion of the operation thereof, means manually releasing the said circuit breaking means, and means manually completing the circuit to the said indicating means actuating lever solenoid for resetting the indicating means.

ASA P. PRATHER.
OTHO P. PRATHER.

REFERENCES CITED

The following references are of record in the file of this patent:

UNITED STATES PATENTS

| Number | Name | Date |
| --- | --- | --- |
| 450,966 | Matthews | Apr. 21, 1891 |
| 820,123 | McMurtry | May 8, 1906 |
| 1,146,320 | Fish | July 13, 1915 |
| 1,626,620 | Mentzer | May 3, 1927 |
| 1,993,949 | Welser | Mar. 12, 1935 |
| 2,091,357 | Goldsmith | Aug. 31, 1937 |
| 2,181,728 | Greentree | Nov. 28, 1939 |
| 2,361,826 | Dowden | Oct. 31, 1944 |